(12) United States Patent
Bryant

(10) Patent No.: US 7,248,401 B2
(45) Date of Patent: Jul. 24, 2007

(54) COMMON-APERTURE MULTISPECTRAL OBJECTIVE

(75) Inventor: Kyle R. Bryant, Alexandria, VA (US)

(73) Assignee: United States of America as Represented by the Department of the Army, Washington, DC (US)

( * ) Notice: Subject to any disclaimer, the term of this patent is extended or adjusted under 35 U.S.C. 154(b) by 0 days.

(21) Appl. No.: 11/158,353

(22) Filed: Jun. 21, 2005

(65) Prior Publication Data
    US 2006/0285201 A1    Dec. 21, 2006

(51) Int. Cl.
    G02B 5/08      (2006.01)
    G02B 13/14     (2006.01)
    G02B 27/14     (2006.01)
(52) U.S. Cl. .................. 359/351; 359/357; 359/634
(58) Field of Classification Search ........ 359/350–361, 359/583, 589, 618–620, 629–641, 850–861
    See application file for complete search history.

(56) References Cited

U.S. PATENT DOCUMENTS

| 5,631,770 | A | * | 5/1997 | Jarmuz | ..................... 359/351 |
| 5,841,574 | A | * | 11/1998 | Willey | ..................... 359/351 |
| 6,174,061 | B1 | * | 1/2001 | Cooper | ..................... 359/857 |
| 6,252,719 | B1 | * | 6/2001 | Eichenbaum | .............. 359/634 |
| 6,396,647 | B1 | * | 5/2002 | Chen | ..................... 359/738 |
| 6,781,127 | B1 | * | 8/2004 | Wolff et al. | .............. 250/332 |
| 6,999,231 | B2 | * | 2/2006 | Bryant | ..................... 359/359 |

* cited by examiner

Primary Examiner—Thong Q. Nguyen
(74) Attorney, Agent, or Firm—Andrew Romero

(57) ABSTRACT

A common-aperture, multispectral device uses a folded beamsplitter to simultaneously image near infrared (NIR) and long wave infrared (LWIR) spectral bands. The folded-path optical design makes the sensor extremely compact and lightweight without compromising the F/# or field of view. The design is split into two channels; a NIR channel and a LWIR channel. A Zinc Sulfide environmental window provides the input to the device. The input first is split into the two channels via a Germanium (Ge) beam-splitter. For the NIR Channel, the input is focused directly onto a faceplate through a series of optics. For the LWIR Channel, the input is focused onto the Ge window via a folded design including a first Ge lens, a fold mirror, and then a second Ge lens. From the faceplate of the NIR channel and the Ge window of the LWIR channel, the input is then processed by respective focal planes.

10 Claims, 2 Drawing Sheets

Ray Trace Showing both NIR and LWIR Channels integrated with Flat Plate Beam-Splitter

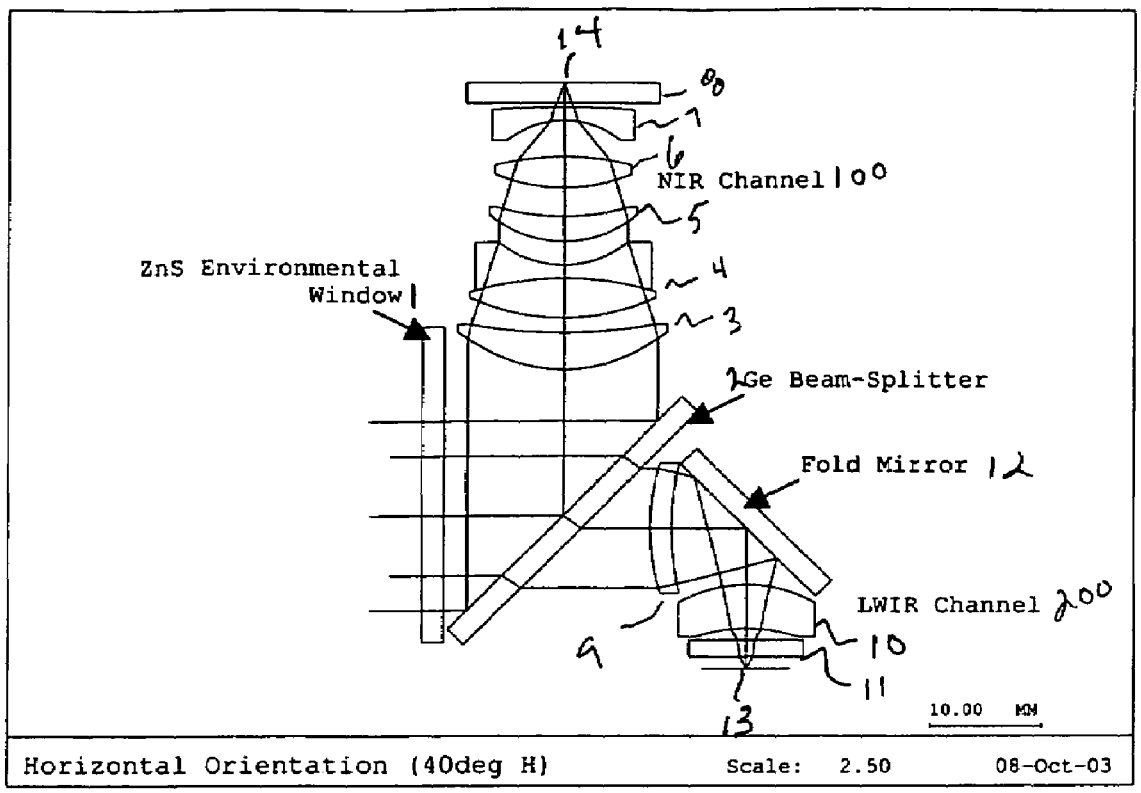
Figure 1: Ray Trace Showing both NIR and LWIR Channels integrated with Flat Plate Beam-Splitter

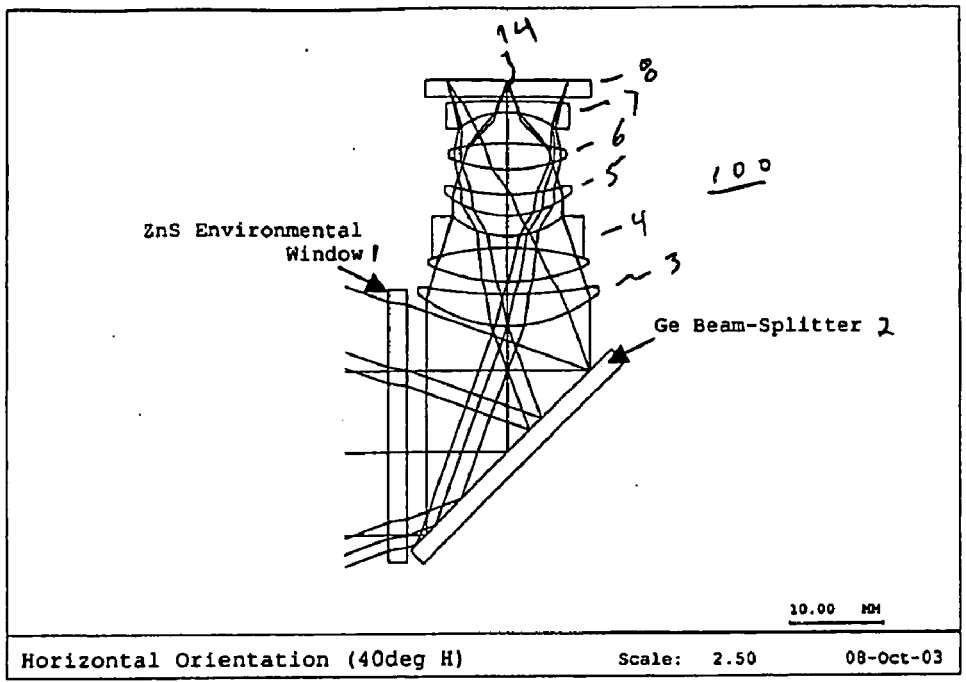
Figure 2: Ray Trace Showing NIR Channel and Vertical Ray Fan
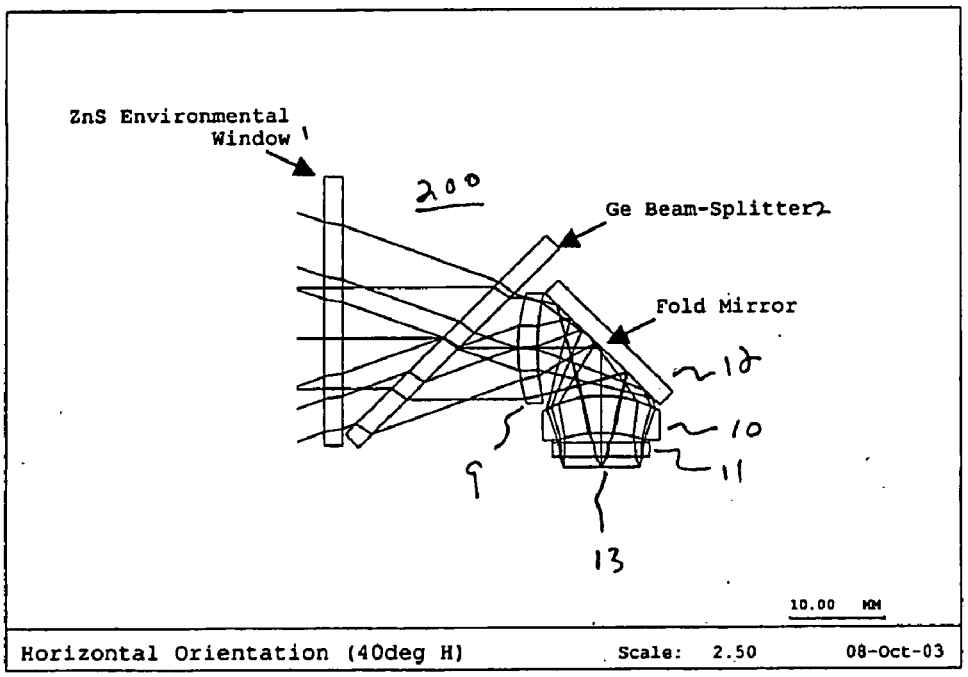
Figure 3: Ray Trace Showing LWIR Channel and Vertical Ray Fan

COMMON-APERTURE MULTISPECTRAL OBJECTIVE

GOVERNMENT INTEREST

The invention described herein may be manufactured, used, sold, imported, and/or licensed by or for the Government of the United States of America.

FIELD OF INTEREST

The invention relates to common-aperture vision systems using multispectral (two or more separate wavebands) imaging techniques.

BACKGROUND OF THE INVENTION

Previous work with sensor fusion used separate sensors and large amounts of signal processing to fuse the images for display. These previous common-aperture optics used mirrors and large, cube beamsplitters. These components do not provide fast F/# and wide fields of view without significant cost in weight and size. Multispectral optical materials for cube beamsplitters are extremely heavy and expensive. Also, the multispectral beamsplitters' optical coatings are either extremely expensive, too thick, or impossible to produce on the inner face of a cube beamsplitter. Multispectral optical materials also have relatively low bulk transmission, and this must be minimized. Because of these limitations, it would be advantageous in the art to provide an optical design which is reproducible, has a flat-plate beamsplitters, and minimizes the use of multispectral optical materials.

The present invention addresses these needs.

SUMMARY OF THE INVENTION

Accordingly, one object of the present invention is to provide an optical design which is reproducible, uses a flat-plate beamsplitters, and minimizes the use of the multispectral optical materials.

Another object of the present invention is to provide a common-aperture objective that has all the above qualities and has a fast F/#, a wide field of view, and has minimal weight and size so it can be mounted on a helmet.

These are other objects of the invention are achieved by using a folded beamsplitter to simultaneously image the near infrared (NIR) and long wave infrared (LWIR) spectral bands, thereby allowing real-time image and sensor fusion. The folded-path optical design makes the sensor extremely compact and lightweight without compromising the F/# or field of view.

The design is split into two channels a NIR channel and a LWIR channel. A Zinc Sulfide (ZnS) environmental window provides opening for the input to the device. The input first is split into the two, equal length channels via a Germanium (Ge) beam-splitter. This Ge flat-plate beamsplitter has an optical coating on a first surface that transmits LWIR radiation and reflects NIR radiation. For the NIR Channel, the input is focused directly onto a faceplate through a series of optics. For the LWIR Channel, the input is focused onto to Ge window via a folded design including a first Ge Lens, a fold mirror, and then a second Ge lens. From the faceplate of the NIR Channel and the Ge window of the LWIR channel, the input is then processed by respective focal planes. Because of the design of the invention, the focal planes lie parallel to one another and therefore, the forward projection of the system is extremely flat. Because it is flat and small, the whole system can be placed in close contact with a mounting surface, like a helmet. Further, because the channels are of equal length from the input, the images can be fused in real time relative one another, thus, greatly simplifying the image processing.

BRIEF DESCRIPTION OF THE DRAWINGS

These and other objects of the invention will become readily apparent in light of the Detailed Description Of The Invention and the attached drawings wherein:

FIG. 1 is a schematic representation of the invention.

FIG. 2 is schematic representation of NIR channel of the invention.

FIG. 3 is schematic representation of LWIR channel of the invention.

DETAILED DESCRIPTION OF THE INVENTION

The invention uses a folded beamsplitter to simultaneously image near infrared (NIR)(600 nm to 900 nm) and long wave infrared (LWIR)(8000 nm to 12000 nm) spectral bands, thereby allowing real-time image and sensor fusion. The folded-path optical design makes the sensor extremely compact and lightweight without compromising the F/# or field of view.

FIG. 1 is a schematic representation of the invention and show the layout of the integrated optical components of the invention. The design is split into two channels a NIR channel 100 and a LWIR channel 200. The optical axes of each channel are aligned. The entrance pupil locations coincide because each channel has the same optical path difference from the outside surface (input) to its aperture stop. Along these channels, there are no powered lenses. The aperture stop of each channel lies on the first surface of the first powered lens in the channel.

A Zinc Sulfide (ZnS) environmental window 1 provides the opening for the input to the device. The input first is split into the two channels via a Germanium (Ge) beam-splitter 2. This Ge flat-plate beamsplitter 2 has an optical coating on a first surface that transmits LWIR radiation and reflects NIR radiation. This is an easily producible coating, which, in high quality, can direct as much as 95% of each waveband's energy to the correct focal plane.

The embodiment shown uses a 40×32 degree Field of View (FOV) on a 12.8×10.24 mm NIR focal plane and a 40×30 degree FOV on an 8×6 mm LWIR focal plane. For the NIR channel, 20 the input is focused directly onto a faceplate through a series of optics. For the LWIR channel, the input is focused onto the Ge window 11 via a folded design including a first Ge lens 9, a fold mirror 12, and then a second Ge lens 10. From the faceplate 8 of the NIR channel 100 and the Ge window 11 of the LWIR channel 200, the input is then processed by respective focal planes. Because of the design of the invention, the focal planes 13 and 14 lie parallel to one another and therefore, the forward projection of the system is extremely flat. Because it is flat and small, the whole system can be placed in close contact with a mounting surface, like a helmet.

The embodiment shown in FIGS. 1-3 is the largest and most difficult form of this invention because it depicts the widest, 40 degree FOV being folded across itself. However, as those skilled in the art will readily appreciate other designs based on the concept of the invention may be fashioned for specific applications. For example, another embodiment would include folding the 32 degree FOV across itself. The reduction of the angle would allow for closer mounting of the optics, and an even smaller, more compact design. Any manner of folding the two channels according to the invention can be engineered for specific applications by those skilled in the art.

FIGS. 2 and 3 are schematic representations of NIR radiation channel and the LWIR radiation channel, respectively. FIG. 2 shows the reflection of the NIR radiation from the beamsplitter through glass lenses that focus the radiation onto the NIR focal plane at the last surface of the glass faceplate 8. The glass lenses in optical series include (in order) a primary lens 3, two doublets 4, a meniscus 5, a biconvex lens 6, and a field corrector 7.

FIG. 3 shows the reflection of the LWIR radiation from the beamsplitter through Ge lenses 9 and 10 that focus the radiation onto the LWIR focal plane at the last surface of a Ge window 11. The radiation is channeled through a first Ge lens to a fold mirror 12 and then to a second Ge lens 10 and onto the Ge window. These Ge lenses 9 and 10 with the fold mirror 12 allow for the novel, low profile optical design.

The Modulation to Frequency (MTF) results of the invention have been determined with standard manufacturing tolerances applied. In this particular embodiment of the invention, the NIR optics has an 80% Modulation axially, at the detector spatial frequency cutoff of 50 line pairs per millimeter (lp/mm). The NIR modulation transfer function is also appreciably high at all fields of view. The LWIR optics have comparable performance specifications.

The LWIR channel has a negligible distortion profile. The NIR channel has only a 2% distortion at the very edge of the 40 degree FOV. This difference, however, will not affect the image fusion between the channels because this difference is so small.

Each channel has an F-number of 1, which is extremely fast, but is required for optimal performance of the low-light sensors for which these optics were originally intended.

What is claimed is:

1. A common-aperture multispectral objective comprising:
    an environmental window;
    a first channel having a first predetermined waveband, the first channel being output to a first focal plane;
    a second channel having a second predetermined waveband, wherein the second channel is optically folded, the second channel being output to a second focal plane; and
    a flat-plate beamsplitter disposed optically after the environmental window, wherein the flat-plate beamsplitter reflects the first predetermined waveband to the first channel and transmits the second predetermined waveband to the second channel,
    wherein the first focal plane and the second focal plane lie parallel to one another and
    wherein the first channel comprising optically in order from the flat-plate beamsplitter a primary lens, two doublets, a meniscus, a biconvex lens, a field corrector and a faceplate.

2. The common-aperture multispectral objective of claim 1 wherein the first predetermined waveband is the near infrared waveband.

3. The common-aperture multispectral objective of claim 1 wherein the second predetermined waveband is the long wave infrared waveband.

4. The common-aperture multispectral objective of claim 1 wherein the second channel comprising optically in order from the flat-plate beamsplitter a first Germanium lens, a fold mirror, a second Germanium lens, and a Germanium window.

5. The common-aperture multispectral objective of claim 1 wherein both the first and second channels have the same optical length to the entrance pupil of each channel.

6. A common-aperture multispectral objective comprising:
    an environmental window;
    a first channel having a first predetermined waveband, the first channel being output to a first focal plane;
    a second channel having a second predetermined waveband, wherein the second channel is optically folded, the second channel being output to a second focal plane; and
    a flat-plate beamsplitter disposed optically after the environmental window, wherein the flat-plate beamsplitter reflects the first predetermined waveband to the first channel and transmits the second predetermined waveband to the second channel,
    the first channel comprising optically in order from the flat-plate beamsplitter a primary lens, two doublets, a meniscus, a biconvex lens, a field corrector and a faceplate.

7. The common-aperture multispectral objective of claim 6 wherein the first predetermined waveband is the near infrared waveband.

8. The common-aperture multispectral objective of claim 6 wherein the second predetermined waveband is the long wave infrared waveband.

9. The common-aperture multispectral objective of claim 6 wherein the second channel comprising optically in order from the flat-plate beamsplitter a first Germanium lens, a fold mirror, a second Germanium lens, and a Germanium window.

10. The common-aperture multispectral objective of claim 6 wherein both the first and second channels have the same optical length to the entrance pupil of each channel.

* * * * *